United States Patent [19]

Chesner

[11] 4,162,982
[45] Jul. 31, 1979

[54] VACUUM FILTER SEGMENT WITH REPLACEABLE SECTOR PLATES

[75] Inventor: Ray J. Chesner, Brookfield, Wis.

[73] Assignee: American Scanmec, Inc., Brookfield, Wis.

[21] Appl. No.: 830,863

[22] Filed: Sep. 6, 1977

[51] Int. Cl.² .............................................. B01D 33/26
[52] U.S. Cl. .................................... 210/486; 210/331; 210/347
[58] Field of Search ............... 210/219, 231, 232, 331, 210/344, 346, 347, 461, 486, 487, 490

[56] References Cited

U.S. PATENT DOCUMENTS

| | | | |
|---|---|---|---|
| 953,495 | 3/1910 | Stockheim | 210/231 |
| 1,685,085 | 9/1928 | Hoyt | 210/331 X |
| 1,746,409 | 2/1930 | Sweetland et al. | 210/331 |
| 1,812,725 | 6/1931 | Stanley et al. | 210/486 X |
| 2,359,368 | 10/1944 | Klopfenstein | 210/461 |
| 3,283,906 | 11/1966 | Crane et al. | 210/347 X |
| 3,363,770 | 1/1968 | Glos | 210/347 X |
| 3,882,016 | 5/1975 | Green | 210/219 X |

FOREIGN PATENT DOCUMENTS

| | | | |
|---|---|---|---|
| 234862 | 7/1961 | Australia | 210/486 |
| 856241 | 12/1960 | United Kingdom | 210/231 |
| 894318 | 4/1962 | United Kingdom | 210/486 |

*Primary Examiner*—Robert H. Spitzer
*Attorney, Agent, or Firm*—Michael, Best & Friedrich

[57] ABSTRACT

Disclosed herein is a vacuum filter segment including a segment frame made up of a sector-shaped frame partially defining a generally sector-shaped central open area and a throat adapted for sealing engagement with a vacuum manifold and for communicating with the central open area. A pair of sector plates are removably secured in a spaced apart mounted position in engagement with the frame and further define the central open area. The sector plates are adapted for supporting a filter medium and include apertures for affording communication between the central open area and the filter medium. The filter segment includes fasteners for removably securing the sector plates without requiring integral bonding or welding of the fasteners to the frame in the mounted position. The frame and sector plates are preferably composed of steel having a urethane coating so as to resist abrasion and corrosion.

5 Claims, 13 Drawing Figures

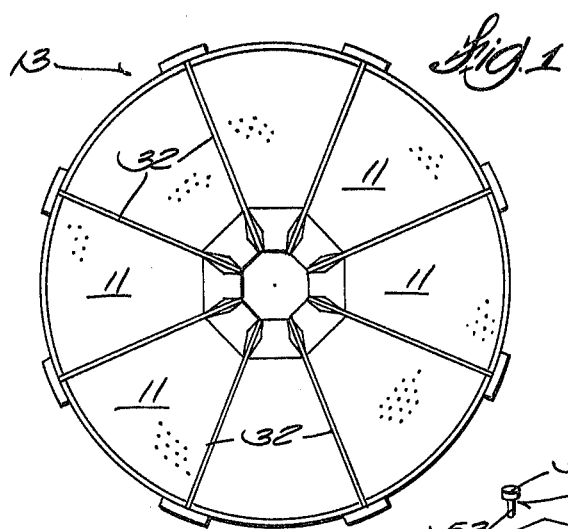
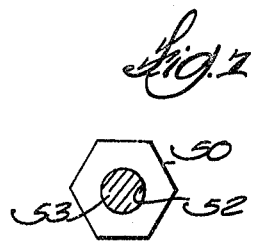
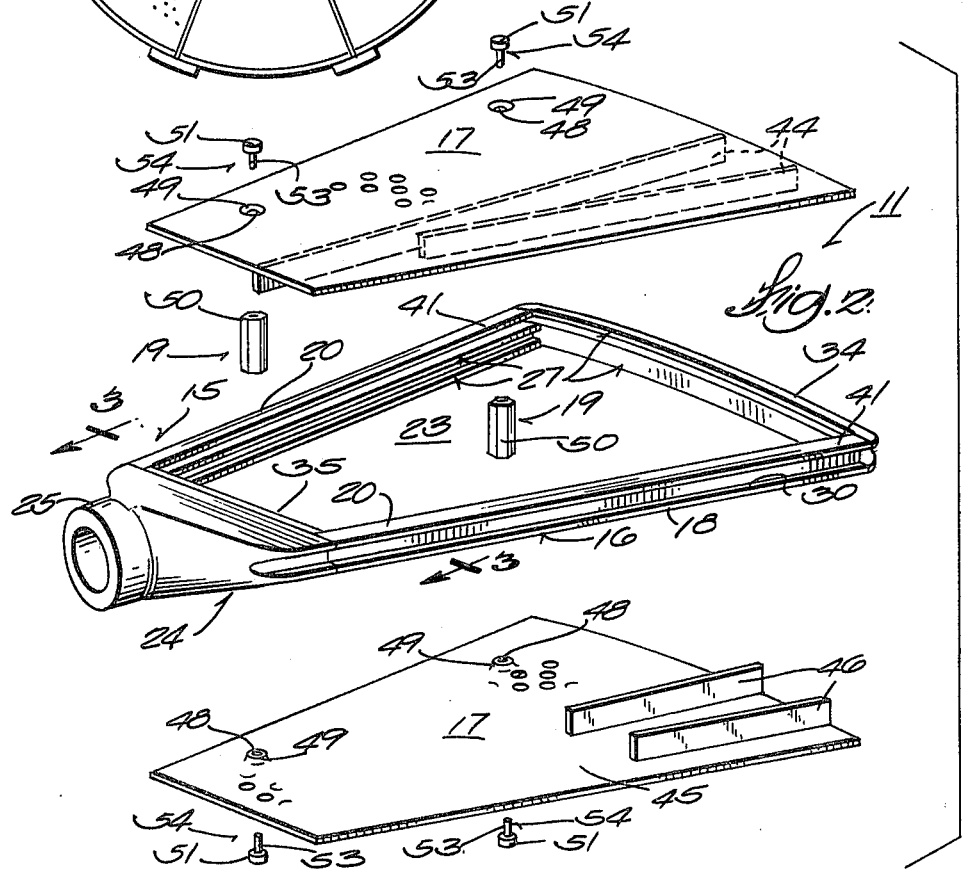
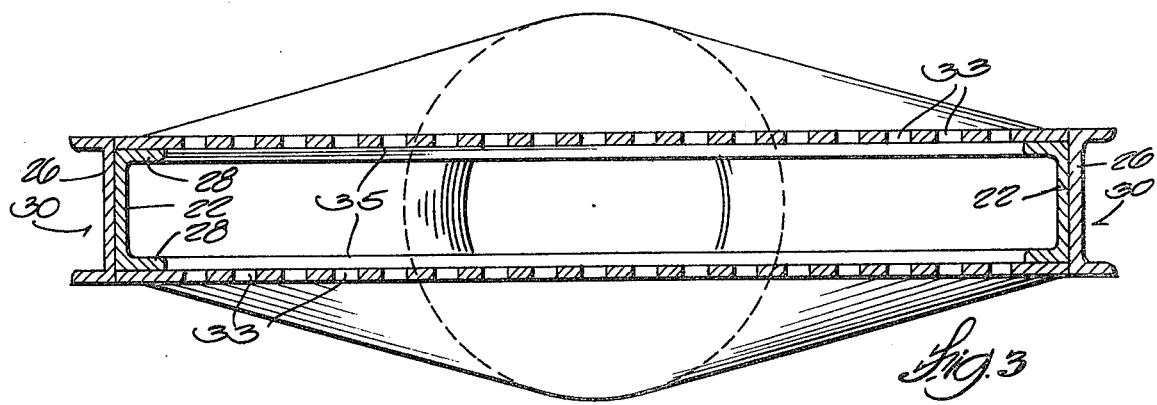

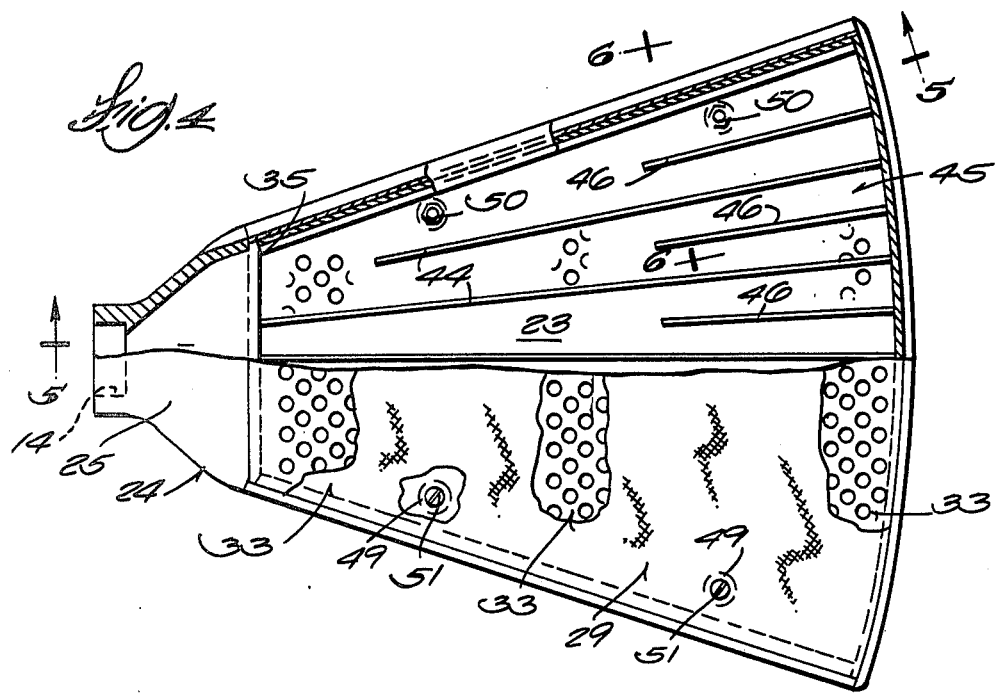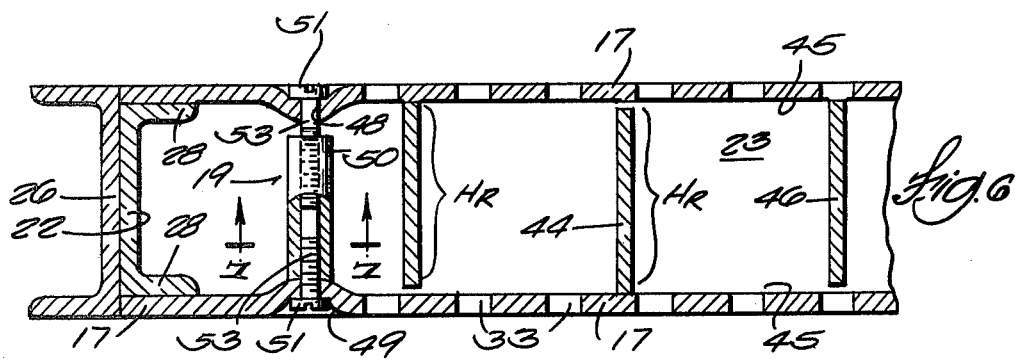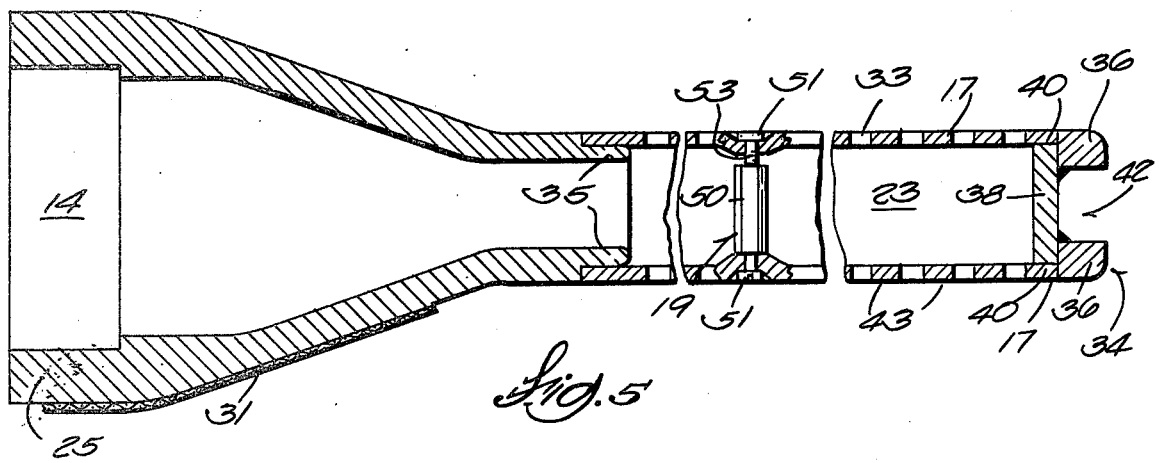

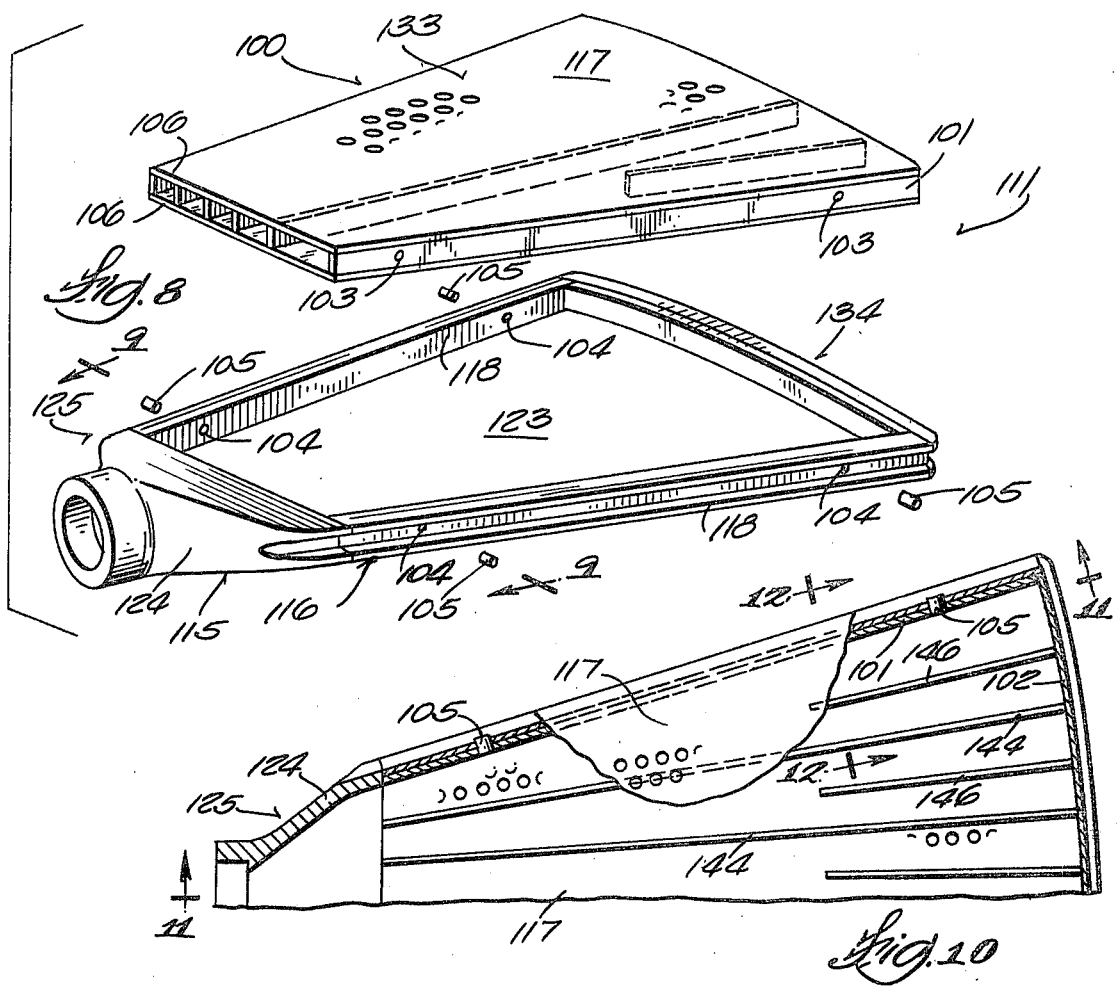
Fig. 8
Fig. 10
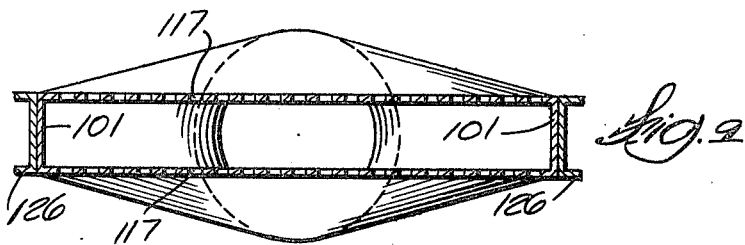
Fig. 9
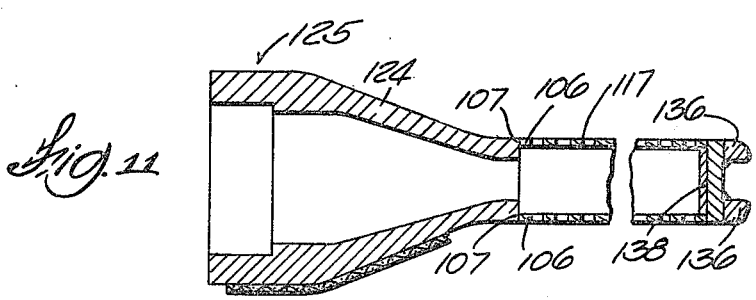
Fig. 11
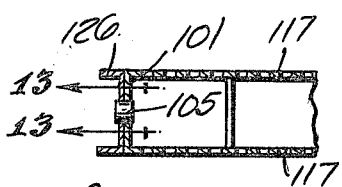
Fig. 12
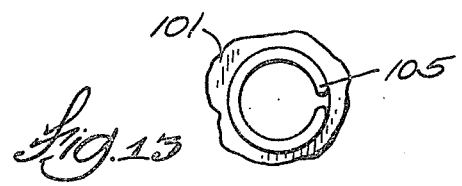
Fig. 13

VACUUM FILTER SEGMENT WITH REPLACEABLE SECTOR PLATES

BACKGROUND OF THE INVENTION

1. Field of the Invention

The invention relates generally to vacuum separators having vacuum filter discs adapted for rotation through a slurry for effecting separation of solid materials, such as iron ore, from the slurry. More particularly, the invention relates to vacuum filter segments which are connected together to make up a vacuum filter disc, and which are adapted to support a filter medium and to be connected to a vacuum source.

2. Description of the Prior Art

Prior art vacuum separators have utilized vacuum filter segments which have been composed of various materials and which have been constructed as one-piece units adapted to support a filter medium. Such filter segments have included a throat which sealingly engages a vacuum manifold and communicates with a central open area which extends between the sector-shaped sidewalls of the filter segment. The sidewalls include apertures for affording communication between the central open area and the filter medium.

During operation of a vacuum separator, a vacuum is transmitted to the central open area and pulls the liquid portion of the slurry inwardly through the filter medium. The solid material or iron ore in the slurry is retained by the filter medium for subsequent removal which is effected after the filter segment has passed through the slurry by transmitting a high positive pressure or blast of air from the central open area through the apertures to the filter medium. The sidewalls of prior art filter segments have tended to wear relatively quickly, (e.g. in about one year) due to the vacuum related stresses on the sidewalls and due to abrasive wear and corrosion resulting from exposure to the slurry.

Some prior art filter segments have utilized steel sector plates which have been tack welded along the perimeter of a generally sector-shaped steel frame. The steel sector plates correspond to and wear like the sidewalls of a one-piece filter segment, and thus, the entire filter segment must often be replaced. In some situations, however, dependent on the severity of the wear, the steel sector plates can be removed from the frame and refurbished or replaced. The removal and replacement process is a troublesome and expensive maintenance operation, it requires torching or burning off the tack welds holding the worn steel sector plates to the steel frame, grinding or smoothing the resulting rough surfaces of the frame, and re-welding the refurbished or replacement steel sector plates back on the frame.

In addition to the removal and replacement of the sector plates being an expensive, time-consuming task, the torch removal of the tack welds can often result in irreparable damage to the sector plates and/or to the sector frame, with the end result that the entire filter segment must still be discarded. Furthermore, even if the sector plates can be removed and replaced, the steel sector-shaped frame is itself susceptible to abrasive wear and corrosion. Thus, at some point in time, replacement of the steel sector plates is no longer feasible, and the entire filter segment must be discarded and replaced.

This invention is concerned with this general area and has among its objects to provide a vacuum filter segment which eliminates some or all of the above noted disadvantages of the prior art.

More specifically, the invention has among its objects to provide a vacuum filter segment which includes a generally sector-shaped frame, filter medium support means or replaceable sector plates, and fastening means adapted for removably securing the sector plates to the segment frame, which fastening means affords relatively quick and inexpensive replacement of the sector plates without incurring damage to the segment frame.

Further, the invention has among its objects to provide such a filter segment wherein the fastening means are adapted to afford removably securing different types of sector plates to the segment frame.

Further, the invention has among its objects to provide such a filter segment wherein the segment frame and sector plates are highly resistant to abrasive wear and corrosion.

SUMMARY OF THE INVENTION

The invention provides a vacuum filter segment including a sector-shaped frame, filter medium support means adapted for being secured in a mounted position in engagement with the frame, and fastening means for removably securing the filter medium support means in the mounted position, preferably without requiring integral bonding or welding to the segment frame.

In accordance with the preferred embodiments of the invention, the segment frame preferably consists of a generally sector-shaped open-ended frame member partially defining a generally sector-shaped central open area, together with wall means secured to the frame member for defining a throat which communicates with the central open area and which is adapted for sealing engagement with a vacuum manifold. The filter medium support means is made up of, and the central open area is further defined by a pair of sector plates adapted for being secured in a spaced apart mounted position in engagement with the segment frame. The sector plates are adapted for supporting a filter medium, such as a porous bag, and include apertures for affording communication between the central open area extending there between and the filter medium.

In accordance with a first preferred embodiment of the invention, the sector-shaped frame member and wall means include portions which form spaced-apart shoulders which extend around the perimeter of the sector-shaped central open area. The sector plates are separate members which are adapted for being secured together in a spaced-apart mounted position, wherein each plate respectively engages one of the spaced-apart shoulders to further define the central open area. The sector plates are removably secured together in the mounted position by fastening means which are preferably spaced from the segment frame and adapted for being secured to and extending between the sector plates.

More particularly, the sector plates include axially aligned apertures which extend transversely through the plates and which are spaced from the segment frame. The fastening means consists of a plurality of screw extenders located between the plates and having threaded bores respectively aligned with the axially aligned apertures. The fastening means also consists of a plurality of screws adapted for extending through the apertures and for being threadingly engaged or secured within the threaded bores for removably securing the plates in the mounted position, i.e. for pulling the sector plates toward one another and against the spaced-apart shoulders of the segment frame. The fastening means are adapted to permit removably securing different types of sector plates to the segment frame.

In accordance with the second preferred embodiment of the invention, the generally sector-shaped frame member and wall means secured to the frame member do not include portions which form spaced-apart shoulders. Instead, the side members of the sector-shaped frame member include transversely extending apertures for affording removably securing or pinning a preassembled sector plate assembly into a mounted position in engagement with the segment frame.

More particularly, the sector plates are preassembled or welded into a sector plate assembly wherein the sector plates are secured in a spaced-apart mounted position. The sector plate assembly includes rectangular side bars which extend between the side edges of the spaced-apart sector plates and which include transversely extending apertures which are adapted to be positioned for respective alignment with the apertures of the side members of the sector-shaped frame member. The sector plates are removably secured in a spaced-apart mounted position in engagement with the segment frame by fastening means which preferably comprise a plurality of roll pins which are driven into the aligned apertures of the frame member side members and the sector plate assembly side bars. The sector plate assembly is adapted for being secured in engagement with the segment frame without requiring integral bonding or welding to the segment frame.

The segment frames and sector plates of the preferred embodiments preferably include outer coatings consisting of a material which is substantially abrasion and corrosion resistant. In particular, the segment frames and sector plates are preferably composed of steel having a urethane coating.

Other features and advantages of the embodiments of the invention will become known by reference to the following general description, the appended claims and drawings.

BRIEF DESCRIPTION OF THE DRAWINGS

FIG. 1 is a diagrammatic front plan view of a vacuum filter disc made up of a plurality of filter segments embodying various of the features of the invention.

FIG. 2 is an enlarged exploded perspective view of an individual vacuum filter segment from the vacuum filter disc shown in FIG. 1.

FIG. 3 is an enlarged sectional view taken along lines 3—3 shown in FIG. 2.

FIG. 4 is a partially broken away top plan view of the vacuum filter segment of FIG. 2 shown assembled.

FIG. 5 is an enlarged partial sectional view taken along segmented lines 5—5 shown in FIG. 4.

FIG. 6 is an enlarged partial sectional view taken along lines 6—6 shown in FIG. 4.

FIG. 7 is an enlarged partial sectional view taken along lines 7—7 shown in FIG. 6.

FIG. 8 is an enlarged exploded perspective view similar to FIG. 2 illustrating another embodiment of the invention.

FIG. 9 is an enlarged sectional view taken along lines 9—9 shown in FIG. 8.

FIG. 10 is a partially broken away partial top plan view of the vacuum filter segment of FIG. 8.

FIG. 11 is an enlarged partial sectional view taken along segmented lines 11—11 shown in FIG. 10.

FIG. 12 is an enlarged partial sectional view taken along lines 12—12 shown in FIG. 10.

FIG. 13 is an enlarged partial view taken along lines 13—13 shown in FIG. 12.

DESCRIPTION OF THE PREFERRED EMBODIMENTS

FIG. 1 diagrammatically shows a vacuum filter disc 13 which is an integral part of a vacuum separator (not otherwise shown) and which is made up of a plurality of filter segments 11 conventionally secured to a main shaft by sector rods 32. Generally, a vacuum separator includes a vacuum source coupled to a manifold mounted on the main shaft and which includes manifold outlets 14, sealingly engaged by the throats of the filter segments (See FIG. 5) which make up the vacuum filter discs. The filter discs are supported by the main shaft for rotation through a lower tank which contains a slurry or liquid mixture or suspension of insoluble materials such as iron ore concentrates in water.

Each filter segment 11 supports and is conventionally covered by a porous filter medium such as a porous bag 29 (partially shown in FIG. 4), and includes perforations or apertures 33 which communicate with a central open area 23 located within the filter segment. During operation, the central open area is coupled to a vacuum source, a liquid portion of the slurry is drawn through the filter medium and the apertures, and a portion of the solid material in the slurry is trapped or retained on the face of the filter medium, thereby effecting the basic vacuum separation of the non-soluble material (e.g. iron ore concentrates) from the liquid portion of the slurry. The iron ore concentrate is removed by being blown off the filter medium after it has been rotated through the slurry and above the lower tank.

In the first preferred embodiment of the invention shown in FIGS. 2-7, each filter segment 11 is made up of a generally sector-shaped frame 15, filter medium support means (shown as a pair of separate sector plates 17) adapted for being secured in a mounted position in engagement with the frame 15, and fastening means, generally designated 19, adapted for removably securing the sector plates 17 in the mounted position (See FIG. 4) without requiring any integral bonding or welding of the fastening means to the segment frame.

The segment frame 15 is made up of a generally sector-shaped open-ended frame member 16 which partially defines or bounds a generally sector-shaped central open area 23, and is secured to wall means 24 which defines or forms a throat 25 which communicates with the central open area 23 and which is adapted for sealingly engaging the vacuum manifold outlet 14 (See FIG. 5). The frame member 16 and wall means 24 also define spaced-apart shoulders, generally designated 27, which extend around the perimeter of the sector-shaped central open area 23 in spaced-apart relation, and upon which the sector plates 17 rest, when secured in the mounted position.

More particularly, the frame member 16 includes a pair of side members 18 having inner end portions 20 secured to the throat 25, and which extend on opposite sides of the central open area 23. As best shown in FIGS. 3 and 6, the side members 18 each consist of an inner U-shaped channel member 22 and a larger, outer U-shaped channel member 26. The U-shaped channel members are suitably secured such as by welding in back-to-back relation. The inwardly extending spaced apart arms 28 of the inner U-shaped channel members 22 partially form or define the spaced apart shoulders 27 which extend around the perimeter of the central open area 23. The outer channel members 26 form openings or channels 30 which are adapted to partially engage or surround adjacent filter sector rods 32 (shown diagrammatically in FIG. 1) which are utilized to secure the filter segments 11 together to form the vacuum filter disc 13.

The frame member 16 also includes an arcuate or curved generally U-shaped end member 34 made up of curved spaced apart flanges 36 (See FIG. 5) suitably secured or welded to a curved generally rectangular member 38 which has spaced-apart recessed side edges 40 (i.e. recessed relative to the flanges 36) to further partially form or define the spaced-apart shoulders 27. The U-shaped end member 34 is secured at its ends to the outer ends 41 of the side members 18. The spaced-apart flanges 36 form a channel or groove 42 which is adapted to receive the overlapping portions of the filter medium or porous bag 29. To complete the forming of the spaced apart shoulders 27, the wall means 24 defining the throat 25 include spaced-apart lips 35 secured to and extending in generally coplanar relation with the spaced-apart arms 28 of the side members.

The components of the segment frame 15 can be constructed of any suitable material which can withstand the mechanical forces exerted on the segment during rotation through the slurry. It is preferred that the wall means 24 be formed of cast steel, and that the frame member 16 be composed of steel members which are suitably secured or welded together and to the wall means. The segment frame 15 preferably includes an outer coating 31 (diagrammatically and partially shown in FIG. 5) consisting of a material such as an epoxy resin or an elastomer which is substantially abrasion and corrosion resistant. In particular, the coating 31 preferably consists of urethane which can be applied by utilizing a conventional spray coating process.

The sector plates 17 are adapted for being secured in a mounted position wherein each of the plates sealingly engages one of the spaced-apart shoulders 27 to further define the central open area 23. As noted above, each sector plate 17 is perforated or includes apertures 33 which afford communication of the vacuum from the central open area 23 to the filter medium or bag 29. As the vacuum is transmitted to the central open area 23, the liquid portion of the slurry through which the filter segment is rotated is drawn through the filter medium and the apertures 33, and into the central open area. The liquid is then pulled through the throat 25 and is subsequently discharged from the vacuum separator in a conventional manner.

In order to facilitate the liquid flowing toward the throat, and to help prevent the sector plates 17 from being pulled together and cracking under the forces resulting from the vacuum in the central open area, at least one of the sector plates 17 includes suitably secured laterally spaced runners extending transversely from its interior surface 45. More particularly, it is preferred that one of the sector plates 17 includes relatively long runners 44 while the other plate 17 includes shorter runners 46. The long and short runners extend between the plates and are alternately spaced when the sector plates are secured in the mounted position.

As best shown in FIG. 6, the height of the runners, designated $H_R$, is slightly less than the distance or spacing between the spaced-apart shoulders 27 designated $H_S$ (shown as the distance between the outer surfaces of the spaced-apart arms 28). This affords the sector plates 17 exerting a force on or being pressed against the shoulders 27 when the plates are pulled or clamped together by the fastening means to be removably secured in the mounted position.

While various fastening means arrangements are possible, the fastening means 19 are preferably spaced from the segment frame 15 (e.g. an inch or more) and are adapted for being secured to and extending between the sector plates for removably holding the plates in a mounted position. Although the regular sector plate apertures 33 could be utilized with the fastening means, it is preferred the sector plates 17 include axially aligned apertures 48 which are preferably located in recessed portions or "dimples" 49 formed in the plates to prevent interference with the filter medium. More particularly, the fastening means 19 consists of a plurality of screw extenders 50 located between the plates and having threaded bores 52 (see FIG. 7) respectively aligned with the aligned apertures 48. In order to removably secure the plates in the mounted position, the fastening means also consists of pan head screws 54 which have heads 51 which fit into the dimples 49 and shafts 53 which extend through the aligned apertures 48 and are threadedly engaged or screwed into the threaded bores 52 for pulling the sector plates toward each other and in engagement with the shoulders 27. The sector plates are assembled by first securing the screw extenders to one of the plates (e.g. the top plate shown in FIG. 6) and by securing the other free plate to the screw extenders. The inward travel of the free plate is stopped when the runners engage both sector plates (engagement with both plates not specifically shown).

Since the fastening means 19 are spaced from the segment frame and secure the sector plates without requiring integral bonding or welding of the fastening means to the frame, the sector plates can be removed and replaced without incurring damage to the frame. For example, in order to achieve a relatively quick and inexpensive replacement of the sector plates, the heads 51 of the screws 54 can be quickly burned or knocked off without risking damage to the segment frame.

Like the segment frame 15, the sector plates 17 preferably include a coating 43 (diagrammatically and partially shown in FIG. 5) consisting of a material which is substantially abrasion and corrosion resistant. In particular, it is preferred that both the segment frame 11 and the sector plates 17 are composed of steel and have a Urethane coating.

Shown in FIGS. 8 through 13 is a second preferred embodiment of the invention similar to the first embodiment previously described. More particularly, the filter segment 111 shown in FIGS. 8–13 differs from the filter segment 11 previously described in that the sector plates 117 are preassembled into a sector plate assembly, or filter medium support means, generally designated 100, and in that the segment frame 115 is modified so that different fastening means can be utilized for removably securing the sector plate assembly or sector plates 117 to the segment frame. Components of the filter segment 111 which are similar to components of the filter segment 11 will be identified with the same numbers plus 100 and will not be described in detail.

In addition to the sector plates 117, the sector plate assembly 100 is made up of two elongated rectangular side bars 101 and a curved rectangular end bar 102. The side and end bars extend between and are respectively suitably secured, such as by welding, to the outer side and end edges of the sector plates 117. Thus, the sector plates 117 are secured in a spaced-apart mounted position. Also, long and short runners 144 and 146, having a height substantially equal to the height of the rectangular side and end bars, are preferably secured or welded to the interior surfaces of both of the sector plates 117 to reinforce and complete the sector plate assembly. The side bars 101 each include one or more apertures 103 (two shown) which extend transversely therethrough and which are adapted to be positioned to align with apertures extending through the side members of the segment frame (described below) to facilitate removably securing the sector plates or sector plate assembly to the sector frame.

As was described with the sector plates 17 earlier, the sector plates 117 support a filter medium (not shown) and contain apertures 133 through which a slurry is drawn. The filter segment frame 115 differs from the previously described segment frame 15 in that the sector-shaped frame member 116 and wall means 124 do not include portions with defined spaced-apart shoulders. Instead, the side members 118 only consist of U-shaped outer channel members 126 (rather than back-to-back inner and outer U-shaped channel members) and include transversely extending apertures 104 which can be aligned with the apertures 103 of the sector plate assembly side bars 101.

The curved generally U-shaped end member 134 of the frame member 116 includes spaced-apart flanges 136 secured to a curved generally rectangular member 138. The rectangular member 138 is not recessed relative to the flanges 136. The wall means 124 defines a throat 125, but the throat 125 does not include spaced-apart shoulders. Instead, the inner end edges 106 of the sector plates 117 sealingly engage the corresponding end edges 107 of the wall means 124 defining the throat 125.

The components of the segment frame 115, i.e. the side members 118, end member 134, and throat 125 are dimensioned to define the perimeter of the generally sector-shaped central open area 123 so that the sector plate assembly 100 can be inserted into the open area. The segment frame 115 and sector plate assembly 100 are dimensioned so that when the assembly 100 is inserted into the open area 123 the side bar apertures 103 and side member apertures 104 can be aligned to facilitate the side members 118 of the frame 115 and the side bars 101 of the assembly 100 being fastened together.

More particularly, while various fastening means arrangements could be utilized, such fastening means preferably comprises roll pins 105. As best shown in FIG. 10, the roll pins 105 are adapted to be driven into the aligned apertures 103 and 104 after the sector-plate assembly has been inserted into the central open area 123. Since there are no substantial forces which tend to separate the sector plate assembly 100 from the segment frame 115 during rotation through the slurry, the roll pins 105 can be utilized to removably secure the sector plates 117 in a spaced-apart mounted position in engagement with the segment frame 115 without requiring integral bonding or welding of the roll pins to the frame.

In order to release and replace the sector plates or sector plate assembly 100, the roll pins 105 are simply driven or knocked inwardly through the apertures 103 and 104 into the central open area 123 bounded by the sector plates 117. It should be noted that the long and short runners 144 and 146 are spaced away from the side bar apertures 103 to insure that the roll pins 105 can be driven inwardly into the central open area without interference. Thus, the sector plate assembly or sector plates 117 can be quickly and inexpensively removed and replaced without risking damage to the segment frame.

As was previously described with regard to the filter segment frame 15 and sector plates 17, the segment frame 115 and the sector plates 117, and other components of the sector plate assembly 100, are preferably composed of steel and include a coating (not shown) such as urethane which is abrasion and corrosion resistant. It should be appreciated that the fastening means of both the first and second embodiments, e.g. the screw extenders 50 or the roll pins 105, are adapted to afford removably securing different types of sector plates or sector plate assemblies to the segment frame. For example, the sector plates could have deep surface grooves running into the throat 125, which grooves would collect the slurry pulled through the filter medium supported on the outer surfaces of the sector plates.

It is to be understood that the invention is not confined to the particular constructions and arrangements of parts herein illustrated and described, but is intended to embrace all such modified forms thereof which come within the scope of the following claims.

I claim:

1. A vacuum filter segment comprising, in combination,
    a generally sector-shaped frame including a generally sector-shaped frame member partially defining a generally sector-shaped central open area and wall means secured to said frame member for defining a throat which communicates with said sector-shaped central open area and which is adapted for sealing engagement with a vacuum manifold, said frame member and said wall means defining the perimeter of said central open area, said frame member including a pair of side members secured to said wall means and extending on opposite sides of said central open area, said side members each including at least one aperture extending transversely therethrough,
    a unitary sector plate assembly including a pair of sector plates adapted for supporting a filter medium and including apertures extending therethrough for affording communication between said central open area and the filter medium, said sector plates including a pair of side bars extending between the side edges of said sector plates, said side bars including apertures adapted for being aligned with said side member apertures when said sector plate assembly is located in a mounted position within said perimeter of said central open area, and
    fastening means for extending into said aligned apertures for removably securing said sector plate assembly in said mounted position without requiring integral bonding or welding of said fastening means to said sector-shaped frame.

2. A filter segment as specified in claim 1 wherein said sector-shaped frame and said sector plate assembly each include an outer coating consisting of a material which is substantially abrasion and corrosion resistant.

3. A filter segment as specified in claim 1 wherein said sector-shaped frame and each of said sector plates is composed of steel having a urethane coating substantially resistant to abrasion and corrosion.

4. A vacuum filter segment as specified in claim 1 wherein said fastening means comprises a plurality of roll pins adapted for being driven into said aligned apertures for removably securing said sector plate assembly in said mounted position.

5. A vacuum filter segment as specified in claim 4 wherein said sector plate assembly includes runners secured to and extending between the interior surfaces of said sector plates, said runners being spaced away from said side bar apertures so that said roll pins can be knocked inwardly through said apertures into said central open area to release said sector plate assembly from said mounted position.

* * * * *